March 23, 1971  G. J. WADE  3,572,322
TRANSDUCER ASSEMBLY
Filed Oct. 11, 1968  2 Sheets-Sheet 1

March 23, 1971  G. J. WADE  3,572,322
TRANSDUCER ASSEMBLY
Filed Oct. 11, 1968  2 Sheets-Sheet 2

United States Patent Office

3,572,322
Patented Mar. 23, 1971

3,572,322
TRANSDUCER ASSEMBLY
Gerald James Wade, Middletown, Conn., assignor to
Hoffmann-La Roche Inc., Nutley, N.J.
Filed Oct. 11, 1968, Ser. No. 766,688
Int. Cl. A61b 5/04
U.S. Cl. 128—2.06                                    5 Claims

ABSTRACT OF THE DISCLOSURE

An integrated transducer assembly adapted to be held against a body surface for instrumentation-patient interface, having a flexible printed circuit member to which is bonded and electrically connected transducers for sensing physiologic functions and providing electrical output signals representative of the physiologic parameters of at least respiratory activity and heart activity.

---

The present invention relates to apparatus for measuring physiologic phenomena and, more particularly, to transducer apparatus for providing electrical representations of such physiologic functions as heart activity, respiration activity, body surface temperature, etc.

In the medical instrument field, and particularly, with present day patient monitoring it is common for the instrumentation-patient interface to involve several different transducer members each applied at a different place on the body and each having its own lead wire connected to the input of a monitoring system. The utilization of such multiple individual transducer units have been found to be a problem for a variety of reasons, i.e., they each experience different motion artifacts, they necessitate the consumption of valuable time in their application to a patient and their being cleaned, the multiple leads often become entangled and are always susceptible to being broken and certainly it cannot be emphasized enough how cumberesome it is for the patient to wear these multiple transducers and their lead wires. This problem with multiple transducers and leads has been found to be even more serious when monitoring newborns, as such patients are very small and very active.

Correct application of such electrodes has been found to be most difficult for most medical personnel due in part to several factors including a lack of proper training in application of the electrodes resulting in a failure to understand how the electrode really works, and, in addition, there is virtually no feedback available to indicate if electrodes have been properly applied. The result is that the electrodes applied by medical personnel make very poor electrical or mechanical contact with the patient. These latter mentioned factors combine to make electrode connections with the patient unreliable and in instances the signals received cannot be distinguished from motion artifacts. Problems such as those represented above for physiologic monitoring purposes are substantially obviated by applicant's present invention.

Generally, the device contemplated by the present invention comprises an integrated transducer assembly capable of measuring at least two physiologic parameters. The physiologic parameters are measured by such transducers as electrodes and strain gauges which are mechanically and electrically connected to a printed circuit unit having a terminal portion from which several lead connections are fed by way of a single cable to monitoring equipment. The printed circuit member which serves as a base member is flexible, enabling the strain gauge member to properly function for measuring respiration. Other advantages of the flexible printed circuit base member enable the transducer assembly to conform with the body surface of the patient to not only make the assembly more comfortable and safe, but further, to simplify its attachment to the patient. The provision of several transducer units incorporated into a single package simplifies transducer application to a patient enabling a single multi-wire cable to be employed. The single package concept facilitates transducer maintenance and storage, and by implementation of a localized terminal section on the flexible printed circuit borad for a cable connection, wire breakage is virtually eliminated. In addition, a common ground reference may be employed for the several different transducer members, thus increasing the effectiveness of the monitoring apparatus and dispensing with extensive electrical hook-up procedures.

Other objects, advantages and capabilities of the present invention will become apparent from the following detailed description taken in conjunction with the accompanying drawings showing only a preferred embodiment of the invention.

Figures 1, 2:
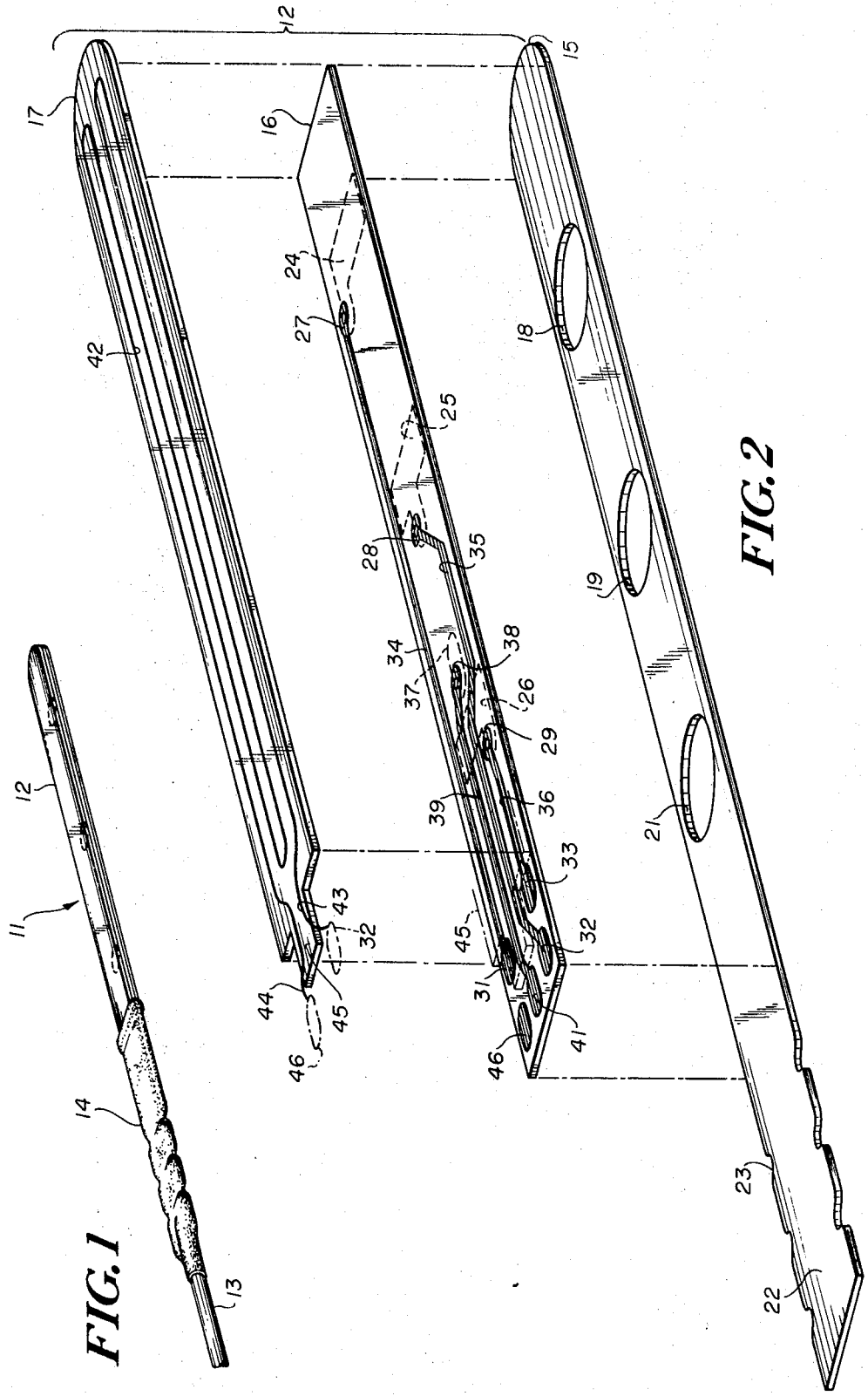
FIG. 1 is a perspective view of the integrated transducer assembly comprising the present invention.
FIG. 2 is an exploded view of the laminated assembly 12 shown in FIG. 1 and incorporating the transducer elements mechanically and electrically connected with the flexible printed board circuit.

With reference to the figures, there is shown in FIG. 1, an integrated flexible transducer assembly 11 incorporating features of the present invention, whereby, as depicted, it may be observed that the unit is elongated, fairly thin and virtually flat for convenient placement on and attachment to the body, suitable dimensions having been found to be a thickness of about twenty-five thousandths of an inch and a length of about four to five inches.

The integrated transducer assembly basically comprises an elongated laminated unit 12 including apparatus for recording electrical representations of at least two or more physiological parameters of a patient to whom the unit as a whole is applied. Connected to one end of the laminated unit 12, are several lead wires encapsulated in a suitably shielded cable 13. A heat shrinkable tubing 14 or other suitable material tightly covers the area of connection between cable 13 and laminated unit 12.

The construction and arrangement of the laminated unit 12 is illustrated in detail in FIG. 2 where there is shown three members 15, 16 and 17 adapted to be laminated together in a sandwich-like arrangement. Unit 15 might be arbitrarily defined as a bottom cover member which is constructed of flexible material such as Mylar, polyvinyl, Kapton, polyamide or other similar suitable plastic or rubber type material, having a thickness of, for example, fifteen thousandths inch. Positioned at spaced intervals along the longitudinal axis of bottom cover member 15 are three circular apertures 18, 19 and 21. One end 22 of member 15 is extended as depicted to provide a handle-like extension for firm attachment with cable 13, the end 22 being supplied with notches 23 employed for gripping the heat shrinkable tubing 14 to more tightly secure cable 13 to unit 12.

Directly above flexible bottom cover member 15 is a flexible printed circuit board 16, made of material similar to base 15, and in the present embodiment shown to be provided at its underside with three electrode members 24, 25 and 26 placed to respectively overlie apertures 18, 19 and 20. Electrode members 24, 25 and 26 could be formed by deposition of a layer of chlorodized silver plated copper. Respectively connected to each of said electrodes is plated through holes 27, 28 and 29, each extending to the topside of board 16. At the cable connected end of board 16 are copper terminal pads 31, 32 and 33, respectively, coupled to plated through holes 27, 28 and 29 by way of rolled copper tracings 34, 35 and 36. Also secured at the underside of board 16 is a thermistor 37, connected by way of a plated through hole 38 to the topside of board 16 and thence by a rolled copper tracing 39 to a terminal pad 41.

Directly over flexible circuit board 16 is a third flexible elongated member 17, made of similar material to base 15 and which basically is utilized as a carrier for a strain sensitive resistance element 42 bonded at its upper surface. The strain element commonly referred to as a strain gauge is adapted to measure any stress at a body surface to which the transducer 11 as a whole is applied. The narrow ribbon like conductive path formed by the strain sensitive resistance element is doubled back and forth several times enabling its two terminal leads 43 and 44 to terminate at a tongue-shaped end 45 of member 17 for respective connection with terminal pads 32 and 46 at printed circuit board 16. The tongue-shaped member 45 serves to insulate the strain sensitive resistance element 42 from copper tracings 35 and 39. The three elongated sandwich members 15, 16 and 17 are of similar configuration and are bonded or laminated together as illustrated to form a single unit 12 as depicted in FIG. 2, which lamination may be conveniently accomplished through an application of pressure and heat. Although a laminated sandwich-type arrangement is depicted in the drawings it should be appreciated that a single flexible printed circuit board member could be utilized whereby space could be provided for by the circuit board to accommodate the mounting of various sensing devices including a strain sensitive resistance member. A suitable cover coat is supplied by application of a vinyl spray coating at the topside of member 17 to form a protective overlay for strain sensitive resistance element 42.

Figure 3:
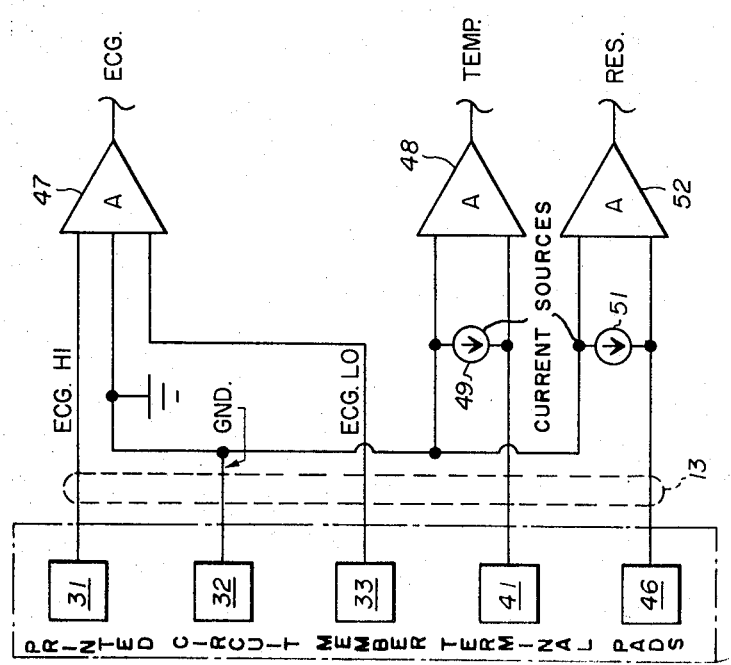
FIG. 3 represents an electrical block diagram disclosing typical input connections with apparatus employed with the various transducer members within the transducer assembly for providing electrical representations of the body functions being sensed.

A typical electrical hook-up from the transducer terminal pads to the input of a device by way of cable 13 for measuring the physiological parameters being detected is illustrated in FIG. 3, where there is displayed in schematic form terminal pads 31, 32, 33, 41 and 46 indicated as being contained within the transducer unit 12. Terminal pads 31 and 33 are arbitrarily and respectively selected as the high and low EKG inputs, and by lead wires are connected to an EKG amplifier 47. Terminal pad 32 arbitrarily selected as ground and provided as a third input via a lead wire to EKG amplifier 47. In view of the latter, electrodes 24, 26 and 25, depicted in FIG. 2 are respectively employed as the EKG:HI, LOW and ground electrodes.

Terminal pad 41, connected from thermistor 37 is connected to an amplifier 48 which has a second lead input connected from terminal pad 32 whereby across the two input leads is a current source 49 providing the necessary operating current capable of providing an output measurement from amplifier 48 representative of small deviations in body temperature when unit 11 is put into operation.

Terminal pad 46 and ground terminal pad 32 respectively connected from terminal leads 44 and 43 of strain gauge 42 are connected across a current source 51 and to the input of amplifier 52, the electrical output of which provides a signal representative of respiratory activity of a body to which the transducer assembly 11 is applied.

Figure 4:
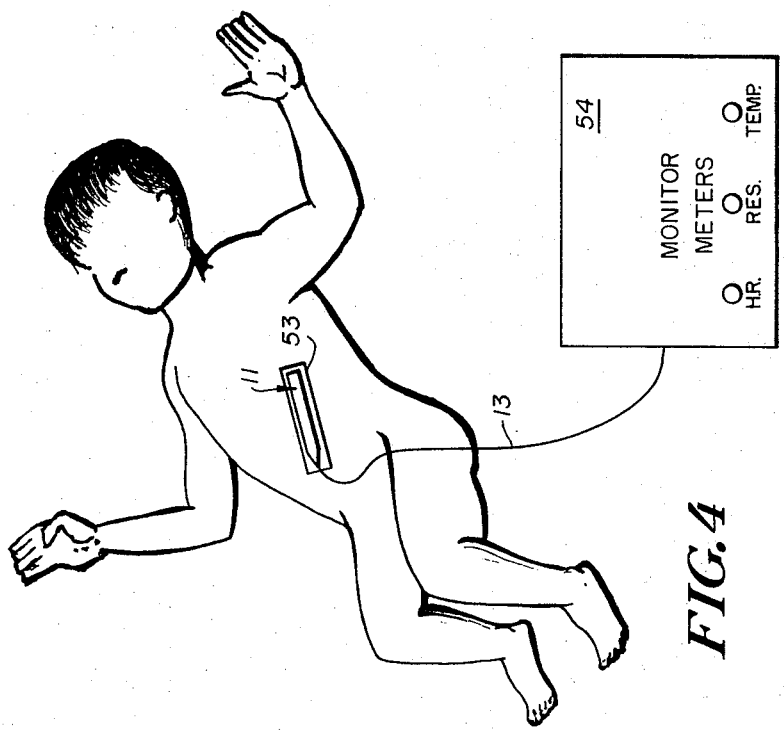
FIG. 4 is a block diagram showing positioning of transducer assembly on a neonatal patient.

In operation, the transducer assembly comprising the present invention is illustrated as being used in conjunction with a neonate, and as shown in FIG. 4 is applied by tape 53 to the neonatal's abdomen at an area which will provide maximum stress of the strain gauge as a function of respiration. The transducer assembly is applied so that electrodes 24, 25 and 26 will face a body area through aperture windows 18, 19 and 21 respectively.

To provide for improved electrical and physical coupling of electrodes 24, 25 and 26 with a body surface, an electrode paste intermediate is employed, whereby apertures 18, 19 and 21 serve as recessed holes to hold a sufficient quantity of the electrode paste to optimize electrical signal transmission. From transducer assembly 11 cable 13 is connected to a monitor 54 to translate the electrical signals derived by the transducer assembly into useful intelligence for alarm, display and/or other purposes.

While a preferred embodiment of the invention has been shown and described, various modifications may be made therein without department from the spirit and scope of the invention, and it is deemed, therefore, that only such limitations shall be placed on the inventions as are imposed by the prior art and set forth in the appended claims.

1. An integrated transducer assembly for application to a body surface and electrical connection to a monitoring device to sense physiologic parameters comprising
   a non-limp flexible printed circuit member,
   sensing means bonded to and electrically connected to said flexible printed circuit member for providing electrical output signals representative of the physiologic parameters of at least respiratory activity and heart activity,
   said sensing means including strain sensitive resistance means adapted for sensing respiration activity and a plurality of electrodes adapted for sensing heart activity, and
   holding means adapted to hold said printed circuit member against the body surface to condition said circuit member to deflect in response to the respiratory process, and enabling said resistance means to produce electrical output signals indicative of respiration.

2. An integrated transducer assembly according to claim 1 whereby said sensing means further includes
   a thermistor adapted for contact with the body surface for sensing body surface temperature.

3. An integrated transducer assembly according to claim 1 including,
   electrical monitoring means connected with said flexible printed circuit member to produce electrical output signals indicative of respiratory activity and heart activity.

4. An integrated transducer assembly according to claim 1 including,
   recessed apertures for exposing said electrodes and adapted to contain electrode paste therein upon application of the integrated transducer assembly to a body surface.

5. An integrated transducer assembly according to claim 1 including:
   a single output cable electrically connected with said flexible printed circuit member for directing said electrical output signals to said monitoring device, and wherein said flexible printed circuit member includes electrical terminal means positioned at one end thereof for electrical connection with said output cable.

References Cited

UNITED STATES PATENTS 3,409,737  11/1968  Settler et al. ____ 728—2.05UX

OTHER REFERENCES

Simpson et al.: "The Lancet," Oct. 13, 1962, pp. 759–760.

Leask et al.: "The Lancet," May 16, 1964, p. 1082.

WILLIAM E. KAMM, Primary Examiner

U.S. Cl. X.R.

128—2.1